(12) United States Patent
Campbell et al.

(10) Patent No.: US 10,392,746 B2
(45) Date of Patent: Aug. 27, 2019

(54) METHOD FOR PREVENTING SCALE FORMATION

(71) Applicant: Kemira Oyj, Helsinki (FI)

(72) Inventors: Clayton Campbell, Easton, MD (US);
James Atkinson, Bradford (GB);
Arkadiusz Zaniewski, Brzoza (PL);
Marko Kolari, Vantaa (FI); Jaakko Ekman, Helsinki (FI)

(73) Assignee: Kemira Oyj, Helsinki (FI)

( * ) Notice: Subject to any disclaimer, the term of this patent is extended or adjusted under 35 U.S.C. 154(b) by 313 days.

(21) Appl. No.: 15/326,543

(22) PCT Filed: Jul. 10, 2015

(86) PCT No.: PCT/FI2015/050499
§ 371 (c)(1),
(2) Date: Jan. 16, 2017

(87) PCT Pub. No.: WO2016/009113
PCT Pub. Date: Jan. 21, 2016

(65) Prior Publication Data
US 2017/0198435 A1    Jul. 13, 2017

(30) Foreign Application Priority Data
Jul. 15, 2014   (FI) ...................................... 20145674

(51) Int. Cl.
| | |
|---|---|
| *D21H 21/02* | (2006.01) |
| *D21H 17/65* | (2006.01) |
| *D21C 3/22* | (2006.01) |
| *D21H 17/67* | (2006.01) |

(52) U.S. Cl.
CPC ............ *D21C 3/226* (2013.01); *D21H 17/65* (2013.01); *D21H 17/675* (2013.01); *D21H 21/02* (2013.01)

(58) Field of Classification Search
CPC .......... D21C 3/22; D21H 17/65; D21H 17/67; D21H 21/02; C02F 5/10
USPC ....... 162/198, 199, 253, 262, 263, 264, 272, 162/380
See application file for complete search history.

(56) References Cited

U.S. PATENT DOCUMENTS

| | | | |
|---|---|---|---|
| 5,744,439 | A | 4/1998 | Bonett |
| 5,998,349 | A | 12/1999 | Guillou |
| 6,171,445 | B1 | 1/2001 | Hendriks et al. |
| 2001/0000064 | A1 | 3/2001 | Hendrik et al. |
| 2003/0075290 | A1 | 4/2003 | Thompson et al. |
| 2003/0200997 | A1* | 10/2003 | Gill .......................... A61L 2/16 134/22.12 |
| 2003/0203827 | A1 | 10/2003 | Cooper et al. |
| 2005/0072743 | A1 | 4/2005 | Schneider et al. |
| 2005/0126727 | A1 | 6/2005 | Thompson et al. |
| 2005/0284592 | A1 | 12/2005 | Jiang et al. |
| 2009/0221704 | A1 | 9/2009 | Aksela et al. |
| 2010/0267791 | A1 | 10/2010 | Kolari et al. |
| 2013/0319627 | A1 | 12/2013 | Van Haute |

FOREIGN PATENT DOCUMENTS

| | | |
|---|---|---|
| EP | 0359590 A2 | 3/1990 |
| EP | 0916622 A1 | 5/1999 |
| EP | 2609990 A1 | 7/2013 |
| JP | 2008100161 A | 5/2008 |
| RU | 2515224 C2 | 5/2014 |
| WO | 0006824 A1 | 2/2000 |
| WO | 0012436 A1 | 3/2000 |
| WO | 03092919 A1 | 11/2003 |
| WO | 2013098478 A2 | 7/2013 |

OTHER PUBLICATIONS

Search Report, FI20145674, Finnish Patent and Registration Office, dated Jan. 13, 2015.
Office Action of Chinese patent application No. 201410376917.1, dated Aug. 17, 2017.
Chinese Patent Office, Office Action dated Apr. 25, 2018.
Russian Search Report of Russian Patent Application No. 2017104654, dated Mar. 4, 2019, 2 pages.

* cited by examiner

*Primary Examiner* — Eric Hug
(74) *Attorney, Agent, or Firm* — Berggren LLP

(57) ABSTRACT

The present invention provides a method for preventing or decreasing scale formation on process surfaces in manufacturing process of paper, board or the like, in which method performic acid is used as an antiscaling agent.

20 Claims, No Drawings

METHOD FOR PREVENTING SCALE FORMATION

PRIORITY

This application is a U.S national application of PCT-application PCT/FI2015/050499 filed on Jul. 10, 2015 and claiming priority of Finnish National application FI20145674 filed on Jul. 15, 2014, the contents of all of which are incorporated herein by reference.

The present invention relates to a method for preventing scale formation on process surfaces in manufacturing process of paper, board or the like according to preamble of the enclosed independent claim.

Scaling denotes the formation of inorganic deposits on process surfaces, and it is often a serious problem in water-rich industrial processes, such as paper and board manufacture. In the paper and board manufacture especially the recent trend towards closed process water circulation has increased the problems relating to the scale formation.

One of the most common scale forming compounds in paper and board manufacture is calcium carbonate. Calcium carbonate is commonly used as filler in the stock as well as mineral pigment in coating compositions. When recycled fibres and broke from the process are used as fibre raw material the levels of calcium carbonate increase in the process flows as well as the risk for formation of calcium carbonate scale on the process surfaces.

Scaling problems are normally solved by adding different antiscalant agents or scale inhibitors to the process water flows. Typical antiscalant compounds are, for example, different phosphonates and polycarboxylates. However, there is a constant need for new effective methods and compounds for reducing scale formation in paper and board manufacture.

An object of this invention is to minimise or even totally eliminate the disadvantages existing in the prior art.

Another object of the present invention is to provide an effective and safe method for preventing scale formation on process surfaces in manufacture of paper and board.

A further object of the present invention is to provide an environmentally friendly method for preventing scale formation on process surfaces in manufacture of paper and board.

These objects are attained with an invention having the characteristics presented below in the characterising parts of the independent claims.

Some of the preferred embodiments of the invention are presented in the independent claims.

Typical method according to the present invention for preventing scale formation on process surfaces in manufacturing process of paper, board or the like uses performic acid as an antiscaling agent.

Now it has been found out that the addition of performic acid effectively prevents, or at least decreases, scale formation on process surfaces in manufacture of paper and board. The results that have been obtained in paper mills suffering from severe scaling problems have been unexpectedly good. It is highly surprising that even small amounts of performic acid are able to successfully reduce and prevent the scale formation. Furthermore, performic acid is a reaction product of formic acid and hydrogen peroxide and it is fully biodegradable and corrosion safe. Thus its use as antiscaling agent is advantageous, as it does not harm the environment or the process equipment.

Performic acid, $CH_2O_3$, is used in the invention as an aqueous solution. Typically the performic acid has a concentration at least 10%, calculated as weight to volume, typically around 13.5%, calculated as weight to volume. Preferably the aqueous performic acid solution is used as an equilibrium solution comprising performic acid, formic acid and hydrogen peroxide.

Performic acid may be added to process water of the paper or board manufacturing process at least one process location, which comprises machine chest, mixing chest, white water channel, wire silo, short circulation loop, white water storage tank, fiber recovery system and/or shower water system. It also possible to add performic acid to process water in several different locations, selected from locations given above.

A preparation unit for performic acid, which is suitable for use in the present invention, has been designed by Kemira Oyj, Finland. Performic acid may thus be prepared in the immediate vicinity of the process location where it is added to the process water. This guarantees the high chemical efficiency of the performic acid. Performic acid is led to the process location through suitable connections and fed to a desired flow of process water by using suitable feeding means.

Preferably performic acid is used during normal paper or board manufacturing process, not only during cleaning shut-downs for cleaning the process surfaces. This means that the addition of the performic acid may be continuous, i.e. performic acid is continuously added to the process water at at least one process location during paper or board manufacturing process. Alternatively performic acid may be added to the process water under specified time period at predetermined time intervals.

The addition of performic acid may be fully automated. It is possible that there is at least one sensor which detects the amount of performic acid in the process water, and the addition of the performic acid may be automatically adjusted according to the information obtained from the at least one sensor. According to one embodiment the concentration of performic acid in the process water is detected, either continuously or at predetermined intervals, and the addition of performic acid is automatically adjusted according to the information obtained about the concentration. This kind of system improves the control of the added amount and guarantees the proper effective concentration of performic acid in the process water.

Performic acid may be added to unfiltered process water and/or fresh water entering the process. It is also possible to add performic acid to filtered process water.

The amount performic acid needed for obtaining a positive antiscaling effect is low, which is advantageous for overall process economy. The addition of the performic acid may be in the range of 0.1-150 mg/l, preferably 0.3-100 mg/l, more preferably 0.5-50 mg/l, even more preferably 0.7-20 mg/l. These values are given as the final concentration of performic acid in the process flow. This means that if the performic acid is added to the to process water in several different locations, the addition in one location may be lower than defined above, as long as the final addition amount is inside the ranges defined above.

Typically the pH of the process water is >7, preferably >7.3, more preferably in the range of 7.5-8.5, before the addition of the performic acid to the process water flow. It has been observed that the addition of the performic acid does not significantly change the pH of the process water, i.e. the pH of the process water remains on the same level after the addition of the performic acid to the process water. This means also that the antiscaling effect, which obtained with the present invention, is not result of a pH reduction, but has some other basis, which is yet not fully understood. According to one preferable embodiment of the invention, the pH value of the process water changes less than 1, preferably less than 0.5, more preferably less than 0.3, pH units after the addition of performic acid. This means that the difference between the pH value of the process water before and after the addition of the performic acid is less than 1, preferably less than 0.5, more preferably less than 0.3, even more preferably less than 0.2, pH units.

According to one preferable embodiment of the invention performic acid is especially used for preventing calcium carbonate scale formation. Calcium scale is common problem in manufacture of paper and board, especially in the manufacture of coated paper grades as well as in paper or board manufacture, where recycled fibres and/or broke are used as raw material. The present invention is advantageous for paper or board manufacturing processes, where the calcium concentration in the circulating process water is in the range of 100-1000 mg/l, preferably 200-800 mg/l, more preferably 400-600 mg/l.

According to one embodiment, the invention is suitable for manufacturing process, which uses a fibre stock, which comprises at least 50 weight-%, preferably at least 75 weight-% recycled fibre material, calculated on basis of dry fibre weight. For example, the fibre material may comprise 50-100 weight-%, preferably 65-100 weight-%, more preferably 75-100 weight-%, recycled fibre material, calculated on basis of dry fibre weight.

According to another embodiment, the invention is suitable for manufacturing process, which uses a fibre stock, which comprises 100 weight-% recycled fibre material. According to still another embodiment, the invention is suitable for manufacturing process, which uses a fibre stock, which comprises 100 weight-% virgin fibre material.

As described, the performic acid effectively prevents or decreases scale formation. It is possible the manufacturing process is free of acid wash steps. Conventionally process surfaces are cleaned from formed scales and deposits by using acid wash, which is performed from time to time. When the present invention is employed, there is no need for separate acid washes, and the process may be completely free of acid washes. This saves time and provides more effective production process.

It has been also observed that performic acid is even able to remove old carbonate scaling from process surfaces. This yields significant scale control and cleanliness improvement, surprising as the effect is not based on lowering pH of the circulating process water.

Performic acid may be used as an antiscaling agent in manufacture of printing paper, writing paper, packaging paper or tissue paper, preferably tissue paper. Typically tissue paper may have a grammage in the range of 10-40 g/m$^2$, preferably 15-35 g/m$^2$. Further, according to one embodiment performic acid may be used as an antiscaling agent in manufacture of coated or uncoated paper or board grades, preferably in manufacture of uncoated paper or board grades.

According to one embodiment of the present invention the performic acid is used as an antiscaling agent for preventing scale formation on process surfaces, which are selected from paper machine surfaces, roll surfaces, process fabrics, wires and/or felts. It has been observed that the permeability of the wires and/or felts of the process is further improved when performic acid is used as antiscaling agent.

EXPERIMENTAL

Some embodiments of the invention are described in the following non-limiting examples.

Example 1: Full-Scale Test in a Tissue Machine

A tissue machine in Western Europe is making tissue grades from 100% deinked pulp. The machine was experiencing severe dirt issues in final tissue product due to extensive carbonate scaling on process surfaces. A sample of hard scale was scraped off from machine surfaces and analysed to contain 96.8% calcium carbonate.

Performic acid was dosed to white water channel, machine chest and to a fibre recovery system of the machine, i.e. to circulating process water circuits only. No performic acid addition was made in broke flow or other storage systems. During the experiment period visual inspections showed that scaling was reduced and earlier regular acid washes of the machine could be omitted.

pH data from the process water before the experiment was collected on three different days during five months preceding the performic acid treatment. The data during the performic acid treatment was collected on about 40 separate days during first nine months of the treatment. Table 1 shows that the average pH of the paper making system increased after the performic acid treatment started. This demonstrates that the surprising effect of reduced carbonate scaling due to performic acid was not due to reduced pH of the system.

TABLE 1 pH before and during performic acid treatment.

| | Average pH | |
|---|---|---|
| | Before treatment | During treatment |
| Final stock chest | 7.1 | 7.5 |
| Machine chest | 7.0 | 7.4 |
| Flow Box | 7.4 | 7.9 |
| White water | 7.5 | 8.1 |
| Fiber recovery system 1, Feed | 7.4 | 7.7 |
| Fiber recovery system 1, Clear filtrate | 7.2 | 7.6 |
| Fiber recovery system 2, Feed | 7.5 | 8.0 |
| Fiber recovery system 2, Clear filtrate | 7.2 | 8.0 |
| Average | 7.3 | 8.0 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for preventing or decreasing scale formation on process surfaces in manufacturing process of paper or board, wherein pH of the process water is >7, said method comprising adding performic acid as an antiscaling agent to process water of the paper or board manufacturing process, whereby the pH value of the process water changes less than 1 pH unit after the addition of performic acid.

2. The method according to claim 1, wherein the performic acid is added to a process water in at least one process location comprising a machine chest, a mixing chest, a white water channel, a wire silo, a short circulation loop, a white water storage tank, a fiber recovery system and/or a shower water system.

3. The method according to claim 1, wherein the performic acid is added to an unfiltered process water and/or a fresh water entering the process.

4. The method according to claim 1, wherein the performic acid is added continuously to the process water in at least one process location.

5. The method according to claim 1, wherein the pH of a process water is >7.3.

6. The method according to claim 1, wherein the pH value of the process water changes less than 0.5 pH units after the addition of performic acid.

7. The method according to claim 1, wherein the addition of the performic acid is in the range of 0.1-150 mg/l.

8. The method according to claim 1, further comprising preventing calcium carbonate scale formation b adding the performic acid.

9. The method according to claim 8, wherein the calcium concentration in circulating water is in the range of 100-1000 mg/l.

10. The method according to claim 1, wherein the process is free of acid wash steps.

11. The method according to claim 1, further comprising:
detecting the concentration of the performic acid in a process water; and
automatically adjusting the addition of the performic acid according to the information obtained about the concentration.

12. The method according to claim 1, wherein performic acid is used as an antiscaling agent in manufacture of printing paper, writing paper, packaging paper or tissue paper.

13. The method according to claim 12, wherein tissue paper has a grammage in the range of 10-40 $g/m^2$.

14. The method according to claim 1, further comprising using a fibre stock in the manufacturing process, which comprises at least 50% recycled fibre material, calculated on a basis of a dry fibre weight.

15. The method according to claim 1, further comprising antiscaling paper machine surfaces, roll surfaces, process fabrics, wires and/or felts by adding the performic acid for use as an antiscaling agent for preventing scale formation on the process surfaces.

16. The method according to claim 1, wherein the pH of the process water is 7.5-8.5.

17. The method according to claim 1, wherein the addition of the performic acid is in the range of 0.3-100 mg/l.

18. The method according to claim 8, wherein the calcium concentration in the circulating water is in the range of 200-800 mg/l.

19. The method according to claim 1, wherein performic acid is used as an antiscaling agent in manufacture of tissue paper.

20. The method according to claim 1, wherein the manufacturing process uses a fibre stock, which comprises at least 75% recycled fibre material, calculated on basis of dry fibre weight.

* * * * *